United States Patent
Udupi et al.

(10) Patent No.: US 9,846,589 B2
(45) Date of Patent: Dec. 19, 2017

(54) VIRTUAL MACHINE PLACEMENT OPTIMIZATION WITH GENERALIZED ORGANIZATIONAL SCENARIOS

(71) Applicant: CISCO TECHNOLOGY, INC., San Jose, CA (US)

(72) Inventors: Yathiraj B. Udupi, San Jose, CA (US); Debojyoti Dutta, Santa Clara, CA (US); Xinyuan Huang, Shanghai (CN); Rishabh Jain, San Jose, CA (US); Aparupa Das Gupta, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 250 days.

(21) Appl. No.: 14/731,166

(22) Filed: Jun. 4, 2015

(65) Prior Publication Data
US 2016/0359668 A1    Dec. 8, 2016

(51) Int. Cl.
*G06F 15/16* (2006.01)
*G06F 9/455* (2006.01)
*H04L 29/08* (2006.01)

(52) U.S. Cl.
CPC ...... *G06F 9/45533* (2013.01); *G06F 9/45558* (2013.01); *G06F 2009/4557* (2013.01); *H04L 67/10* (2013.01)

(58) Field of Classification Search
CPC .............................. G06F 9/45533; H04L 67/10
See application file for complete search history.

(56) References Cited

U.S. PATENT DOCUMENTS

| | | |
|---|---|---|
| 5,519,867 A | 5/1996 | Moeller |
| 6,298,370 B1 | 10/2001 | Tang |
| 7,234,139 B1 | 6/2007 | Feinberg |

(Continued)

FOREIGN PATENT DOCUMENTS

| | | |
|---|---|---|
| WO | WO 2015192251 A1 * | 6/2015 |
| WO | WO2016/057410 | 4/2016 |

OTHER PUBLICATIONS

Dhaval Bonde. Techniques for Virtual Machine Placement in Clouds. 2010.*

(Continued)

*Primary Examiner* — Bryan Lee
(74) *Attorney, Agent, or Firm* — Polsinelli PC (57) ABSTRACT

The present disclosure describes a method for virtual machine placement optimization based on generalized organizational scenarios. The method involves defining a variable matrix (wherein each entry of the variable matrix indicate whether a particular virtual machine is to be placed on a particular host server), a first set of variables (wherein each variable of the first set of variables indicate whether a particular host server has at least one virtual machine to be placed thereon), a second set of variables (wherein the second set of variables indicates for all possible pairs of host servers whether two particular host servers both have at least one virtual machine to be placed thereon). The method further involves determining a set of virtual machine to host server allocations by solving a constraints optimization problem over the first set of variables and the second set of variables based on a generalized organizational scenario.

20 Claims, 6 Drawing Sheets

(56) References Cited

U.S. PATENT DOCUMENTS

| | | |
|---|---|---|
| 7,962,915 B2 | 6/2011 | Eshel |
| 8,276,145 B2 | 9/2012 | Papaefstathiou |
| 8,375,386 B2 | 2/2013 | Hendel |
| 8,484,653 B2 | 7/2013 | Tsirkin |
| 8,544,004 B2 | 9/2013 | Fultheim |
| 8,806,486 B2 | 8/2014 | Martin |
| 8,909,785 B2 | 12/2014 | Franco et al. |
| 8,972,986 B2 | 3/2015 | Palanisamy |
| 9,288,148 B1* | 3/2016 | Krishnaswamy ... H04L 41/0893 |
| 9,367,344 B2 | 6/2016 | Udupi et al. |
| 2002/0129081 A1 | 9/2002 | Rai |
| 2008/0104605 A1 | 5/2008 | Steinder |
| 2011/0067030 A1 | 3/2011 | Isard et al. |
| 2011/0219372 A1 | 9/2011 | Agrawal et al. |
| 2011/0225277 A1 | 9/2011 | Freimuth |
| 2012/0131139 A1 | 5/2012 | Siripurapu et al. |
| 2012/0167101 A1 | 6/2012 | Kandula et al. |
| 2012/0204176 A1 | 8/2012 | Tian |
| 2013/0031559 A1 | 1/2013 | Alicherry |
| 2013/0191843 A1 | 7/2013 | Sarkar et al. |
| 2013/0219068 A1 | 8/2013 | Ballani et al. |
| 2013/0268672 A1 | 10/2013 | Justafort et al. |
| 2013/0290953 A1 | 10/2013 | Li et al. |
| 2013/0290957 A1 | 10/2013 | Li et al. |
| 2013/0339965 A1 | 12/2013 | Meng et al. |
| 2014/0115168 A1 | 4/2014 | Yamashima et al. |
| 2014/0143401 A1 | 5/2014 | Carlen et al. |
| 2014/0201371 A1 | 7/2014 | Gupta |
| 2014/0310712 A1 | 10/2014 | Meng et al. |
| 2014/0380307 A1 | 12/2014 | Zhu et al. |
| 2015/0127834 A1 | 5/2015 | Udupi et al. |
| 2015/0134823 A1 | 5/2015 | Cucinotta |

OTHER PUBLICATIONS

Wang et al. A New Approach to Multi-objective Virtual Machine Placement in Virtualized Data Center. IEEE. 2013.*
Espling et al. Modeling and Placement of Structured Cloud Services. IEEE. 2013.*
USPTO Sep. 13, 2016 Non-Final Office Action from U.S. Appl. No. 14/726,336.
USPTO Jun. 8, 2016 Final Office Action from U.S. Appl. No. 14/242,131.
Lindgren, "Performance Management for Cloud Services: Implementation and Evolution of Schedulers for OpenStack," Communication Networks School of Electrical Engineering, Jul. 2013, 50 pages.
Meng, Xiaoqiao, et al., "Improving the Scalability of Data Center Networks with Traffic-aware Virtual Machine Placement," IEEE INFOCOM 2010, Mar. 14-19, 2010; 9 pages.
OpenStack Configuration Reference, May 10, 2015 docs.openstack.org; 665 pages.
Pachorkar, Nilesh, et al., "Multi-dimensional Affinity Aware VM Placement Algorithm in Cloud Computing," International Journal of Advanced Computer Research, vol. 3 No. 4 Issue-13, Dec. 2013; 5 pages.
Bonde, Dhaval, "Techniques for Virtual Machine Placement in Clouds, MTP Stage 1 Report," Submitted in partial fulllment of the requirements for the degree of Master of Technology, Department of Computer Science and Engineering Indian Institute of Technology, Bombay Mumbai 2010; 18 pages.
Qin, Peng, et al., "Bandwidth-Aware Scheduling with SDN in Hadoop: A New Trend for Big Data," Mar. 12, 2014; Cornell University Library; arXiv:1403.2800v1 [cs.DC]; submitted on Mar. 12, 2014; 8 pages.
Sandholm, Thomas, et al., "MapReduce Optimization Using Regulated Dynamic Prioritization," SIGMETRICS/Performance'09, Jun. 15-19, 2009, Seattle, WA, USA.
Sonnek, Jason, et al., "TR 09-030 Technical Report—Starling: Minimizing Communication Overhead in Virtualized Computing Platforms Using Decentralized Affinity-Aware Migration," Department of Computer Science and Engineering, University of Minnesota, Dec. 2, 2009.
Tang, Xia, et al., "A Reduce Task Scheduler for MapReduce with Minimum Transmission Cost Based on Sampling Evaluation," International Journal of Database Theory and Application vol. 8, No. 1 (2015), pp. 1-10; Feb. 2015 http://dx.doi.org/10.14257/ijdta.2015.8.1.0.
Yan, Cairong, "Affinity-aware Virtual Cluster Optimization for MapReduce Applications," 2012 IEEE International Conference on Cluster Computing (CLUSTER), Sep. 24-28, 2012; 9 pages.
"Using DRS Affinity Rules," VMware vSphere 5.1 Documentation Center; First published on or about Sep. 15, 2012; 8 pages https://pubs.vmware.com/vsphere-51/index.jsp#com.vmware.vsphere.resmgmt.doc/GUID-FF28F29C-8B67-4EFF-A2EF-63B3537E6934.html.
PCT Jan. 13, 2016 International Search Report and Written Opinion from PCT/US2015/054035.
Arnold, et al., "Improving Virtual Machine Performance Using a CrossRun Profile Repository," OOPSLA'05, Oct. 16-20, 2005, San Diego, CA ACM, pp. 297-311, 2005.
Arnold, et al., "Active Covariance Matrix Adaptation for the (1+1)—CMA-ES," GECCO'10, Jul. 7-11, 2010, Portland, Oregon ACM, pp. 385-392, 2010.
Hsieh, et al., Fast Coordinate Descent Methods with Variable Selection for Non-negative Matrix Factorizatrion, KDD'11, Aug. 21-24, 2011, San Diego, CA ACM, pp. 1064-1072, 2011.
Nakajima, et al., "Optimizing Virtual Machines Using Hybrid Virtualization," SAC'11, Mar. 21-25, 2011, TaiChung, Taiwan; ACM, pp. 573-578, 2011.
USPTO Nov. 23, 2015 Non-Final Office Action from U.S. Appl. No. 14/242,131.
USPTO Feb. 22, 2016 Notice of Allowance from U.S. Appl. No. 14/509,691.
U.S. Appl. No. 14/509,691, filed Oct. 8, 2014, entitled "Optimized Assignments and/or Generation Virtual Machine for Reducer Tasks," Inventor(s): Yathiraj B. Udupi, et al.
U.S. Appl. No. 14/726,336, filed May 29, 2015, entitled "Optimized Hadoop Task Scheduler in an Optimally Placed Virtualized Hadoop Cluster Using Network Cost Optimizations," Inventor(s): Yathiraj B. Udupi.
"Optimization with PuLP," Optimization with PuLP—PuLP v1.4.6 documentation, first published on or about Dec. 26, 2010; 1 page.
Fang, Weiwei, et al., "VMPlanner: Optimizing virtual machine placement and traffic flow routing to reduce network power costs in cloud data centers," Computer Networks, vol. 57, Issue 1, Jan. 16, 2013, pp. 179-196.
Gibizer,Balasz, "API: Add soft-affinity policy for server-group," OpenStack Compute (Nova); Blueprints, Apr. 30, 2014, 2 pages https://blueprints.launchpad.net/nova/+spec/soft-affinity-for-server-group.
Gu, Rong, et al., "SHadoop: Improving MapReduce performance by optimizing job execution mechanism in Hadoop clusters," Journal of Parallel and Distributed Computing vol. 74, Issue 3, Mar. 2014, pp. 2166-2179.
Herodotou, Herodotos, et al., "Profiling, What if Analysis, and Cost based Optimization of MapReduce Programs," The 37th International Conference on Very Large Data Bases, Aug. 29, Sep. 3, 2011, Seattle, Washington; 12 pages.
Jiang, Joe Wenjie, et al., "Joint VM Placement and Routing for Data Center Traffic Engineering," INFOCOM 2012, Mar. 25-30, 2012, Orlando, FL; 9 pages.
Kambatla, Karthik, et al., "Towards Optimizing Hadoop Provisioning in the Cloud," HotCloud'09 [2009 conference on Hot topics in cloud computing], Jun. 14-19, 2009; 5 pages.
Kondikoppa, Praveenkumar, et al., "Network-Aware Scheduling of MapReduce Framework on Distributed Clusters over High Speed Networks," Workshop on Cloud Services, Federation, and the 8th Open Cirrus Summit, Sep. 21, 2012, San Jose, CA, USA; 6 pages.
Korupolu, Madhukar, et al., "Coupled Placement in Modern Data Centers," IPDPS '09 Proceedings of the 2009 IEEE International Symposium on Parallel&Distributed Processing, May 23, 2009, pp. 1-12.

(56) References Cited

OTHER PUBLICATIONS

Li, Xin, et al., "Let's Stay Together: Towards Traffic Aware Virtual Machine Placement in Data Centers," INFOCOMM 2014, Las Vegas, NV, Jun. 14-24, 2014; 9 pages.

Liu, Shengyuan, et al., "Evaluating Task Scheduling in Hadoop-based Cloud Systems," 2013 IEEE International Conference on Big Data, Oct. 6-9, 2013, Santa Clara, CA; 6 pages.

Meng, Xiaoqiao, et al., "Improving the Scalability of Data Center Networks with Traffic-aware Virtual Machine Placement," Israel Institute of Technology, 236635—On the Management and Efficiency of Cloud Based Services, Dec. 8, 2010; 39 pages.

USPTO Apr. 11, 2017 Non-Final Office Action from U.S. Appl. No. 14/731,166.

USPTO Apr. 11, 2016 Non-Final Office Action from U.S. Appl. No. 14/242,131.

USPTO May 19, 2017 Notice of Allowance from U.S. Appl. No. 14/242,131.

Guo, Zhenhua et al., "Investigation of Data Locality and Fairness in MapReduce," Proceedings of 3rd International Workshop on MapReduce and its Applications Date, Jun. 18, 2012; 8 pages.

\* cited by examiner

| $X_{11}$ | $X_{12}$ | ...... | $X_{1j}$ | ...... | $X_{1n}$ |
|---|---|---|---|---|---|
| $X_{21}$ | $X_{22}$ | ...... | $X_{2j}$ | ...... | $X_{2n}$ |
| ...... | ...... | ...... | ...... | ...... | ...... |
| $X_{i1}$ | $X_{i2}$ | ...... | $X_{ij}$ | ...... | $X_{in}$ |
| ...... | ...... | ...... | ...... | ...... | ...... |
| $X_{m1}$ | $X_{m2}$ | ...... | $X_{mj}$ | ...... | $X_{mn}$ | m = number of VMs
n = number of host servers where $X_{ij}$ = 1 implies VM $V_i$ will be placed on Host $H_j$.

---

$Y = \{Y_1, Y_2, ... Y_n\}$

Example: $Y_1$ = 1 if Host $H_1$ has at least one VM, and 0 otherwise.

---

$Z = \{Z_1, Z_2, ... Z_p\}$, where each $Z_1$ represents the pair of hosts $H_1$ and $H_2$, $Z_2$ represents the pair $H_1$ and $H_3$, and so on, $p = \binom{n}{2}$ Example: $Z_1$ = 1 if both $H_1$ and $H_2$ have at least one VM, 0 otherwise.

---

$C = \{C_1, C_2, ... C_p\}$, where each $C_1$ represents the cost for the pair of hosts $H_1$ and $H_2$, $C_2$ represents the cost for the pair $H_1$ and $H_3$, and so on, $p = \binom{n}{2}$

FIGURE 3

STRICT AFFINITY

FIGURE 4

STRICT ANTI-AFFINITY

FIGURE 5

SOFT AFFINITY

FIGURE 6

HOST COUNT LIMITATION L=2

FIGURE 7

SOFT AFFINITY WITH LEAST COST
AND HOST COUNT LIMIT L = 2

FIGURE 8

WITH PRUNING & CLUSTERING

FIGURE 9

VIRTUAL MACHINE PLACEMENT OPTIMIZATION WITH GENERALIZED ORGANIZATIONAL SCENARIOS

TECHNICAL FIELD

This disclosure relates in general to the field of computing and, more particularly, to virtual machine placement optimizations with generalized organizational scenarios and constraints.

BACKGROUND

Computer networking technology allows execution of complicated computing tasks by sharing the work among the various hardware resources within the network. This resource sharing facilitates computing tasks that were previously too burdensome or impracticable to complete. For example, the term "big data" has been used to describe data sets that are extremely large and complex, making them difficult to process. Many implementations of computing and networking technologies have been devised to process big data. Cloud platforms for distributed processing allows big data to be processed by many virtual machines allocated to one or more physical host servers. Processing these large datasets is computationally intensive, and taking up resources in a data center can be costly. For this reason, many platforms strive to allocate virtual machines onto the data center in an efficient manner.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

The present disclosure describes, among other things, a method for virtual machine placement optimization based on generalized organizational scenarios. The method comprises receiving a request to place a group of virtual machines onto a set of host servers based on a generalized organizational scenario, defining a variable matrix, wherein each entry of the variable matrix indicate whether a particular virtual machine is to be placed on a particular host server, defining a first set of variables, wherein each variable of the first set of variables indicate whether a particular host server has at least one virtual machine to be placed thereon, defining a second set of variables, wherein the second set of variables indicates for all possible pairs of host servers whether two particular host servers both have at least one virtual machine to be placed thereon, and determining a set of virtual machine to host server allocations by solving a constraints optimization problem over the first set of variables and the second set of variables based on the generalized organizational scenario.

In some embodiments, the variable matrix is of size m by n, where m is the number of virtual machines and n is the number of host servers, the first set of variables has n number of variables, where n is the number of host servers, and the second set of variables has $$\binom{n}{2}$$

number of variables, where n is the number of host servers.

In some embodiments, the generalized organizational scenario is a strict affinity scenario. Solving the constraints optimization problem can include minimizing cost of the virtual machine to host server allocation subject to the constraint that only one host server is selected in a solution of the constraints optimization problem.

In some embodiments, the generalized organizational scenario is a strict anti-affinity scenario. Solving the constraints optimization problem can include minimizing cost of the virtual machine to host server allocation subject to the constraint that m different host servers are selected in a solution of the constraints optimization problem, where m is a number of virtual machines requested to be placed.

In some embodiments, the generalized organizational scenario is a soft affinity scenario. Solving the constraints optimization problem can include determining, by a costs engine, a set of affinity-related costs associated with all possible pairs of host servers, and minimizing cost of the virtual machine to host server allocation subject to the constraint that one or more different host servers are selected in a solution of the constraints optimization problem, wherein the cost to be minimized is computed based on the set of affinity-related costs associated with all possible pairs of host servers. The set of affinity-related costs can have $$\binom{n}{2}$$

number of costs, where n is the number of host servers.

In some embodiments, the generalized organizational scenario specifies a host count limit of L number of host servers to be selected. Solving the constraints optimization problem can include minimizing cost of the virtual machine to host server allocation subject to the constraint that at most L number of servers are selected in a solution of the constraints optimization problem.

In some embodiments, the generalized organizational scenario specifies a soft affinity scenario with a host count limit of L number of host servers to be selected. Solving the constraints optimization problem can include determining a set of affinity-related costs associated with all possible pairs of host servers, and minimizing cost of the virtual machine to host server allocation subject to the constraint that at most L different host servers are selected in a solution of the constraints optimization problem, wherein the cost to be minimized is computed based on the set of affinity-related costs associated with all possible pairs of host servers. The set of affinity-related costs can have $$\binom{n}{2}$$

number of costs, where n is the number of host servers.

In some embodiments, a clustering engine can apply a clustering algorithm to reduce the set of host servers to a subset of host servers on which the virtual machines are to be placed prior to solving the constraints optimization problem based on the subset of host servers.

Example Embodiments

Understanding Organizational Constraints

Cloud infrastructure allows administrators to create and allocate virtual machines (VMs) on a cluster of host servers (sometimes referred simply as "hosts") communicably connected with each other over the network, e.g., in a data center. Complex jobs can be run on the VMs in the data center, e.g., to process big data, or to perform a large number of tasks. An administrator creating and allocating VMs may be concerned about performance issues such as efficiency, cost, fault tolerance, organizational requirements, business policies, etc. When creating a group of VMs in a cloud infrastructure such as OpenStack, some administrators may want to group all the VMs together in a single host server (e.g., to achieve the highest network throughput among the VMs) or sometimes spread them into different host servers (e.g., for fault tolerance). These organizational constraints or requirements are typically called affinity and anti-affinity (respectively), and are often used to decide the VM placement allocation. There could also be other organizational requirements in terms of deciding how the VMs should be allocated in the set of available host servers. For example, an administrator might want to limit the number of host servers that a group of VMs can be spread out for energy efficiency reasons. Either in deciding affinity to a single host or when limiting the number of host servers, an administrator may also want to determine which would be the most optimal host or the set of host servers that should be chosen based on certain cost factors and also the given capacity requirements for the group of VMs.

Conventional systems provide some mechanism to allow administrators to enforce affinity and anti-affinity. However, they are limited, and requires significant effort by the administrator to configure filters or groups. For instance, OpenStack Nova Filter Scheduler has ServerGroupAffinity and AntiAffinity filters provide a way to ensure a group of VMs get placed to a single host (affinity) or different host servers (anti-affinity). OpenStack requires an administrator to manually first create a specific server group, with a specified policy of "affinity" or "anti-affinity" and then add the VMs one by one, by specifying a scheduler hint of the server group id. So, after the first VM gets created on a host, the subsequent VM placements with specified server group id hint, get placed on the same host in the case of affinity, and on different host servers for anti-affinity. In another instance, VMware Dynamic resource scheduler (DRS) supports affinity and anti-affinity rules specified cluster of host servers (a group of hosts), where affinity or anti-affinity rules can be provided. Similar to the OpenStack servergroup, this solution requires an administrator to manually create special DRS VM groups, and DRS host groups, and anything within this special DRS cluster, the system tries to ensure eventual consistency to adhere to the specified rules, by moving the VMs around. Note that neither OpenStack nor VMware DRS offers mechanisms to enforce other organizational constraints (e.g., limits on the number of host servers, taking into account costs or affinity-related costs/penalties, capacity requirements, etc.).

Generalizing Organizational Constraints as Scenarios

To address some of the concerns mentioned above, a unified scheme described herein can accommodate one or more special organizational scenarios (i.e., constraints and/or requirements) without the need to manually specify groups or filters. Specifically, the unified scheme involves a constraints optimization problem that is of linear order for determining optimized VM placements in a cloud infrastructure (e.g., OpenStack). The optimization problem is provided with unique cost functions and specially designed constraints that can accommodate generalized organizational scenarios of generalized strict affinity, generalized strict anti-affinity, soft affinity with least cost, placement with host count limitation, and the combination scenario of soft affinity with least cost and a host count limitation. As a result, the unified constraints driven and cost driven approach to ensure the affinity and anti-affinity rules are met while performing an initial placement of VMs, and also ensuring the optimal set of host servers are chosen based on other requirements too.

The unified scheme supports generalized organizational scenarios such as generalized affinity, generalized anti-affinity, soft affinity, and generic VM distribution requirements in terms of host count limits, etc., all while able to determine optimal placements/allocation for a set of VMs in a cloud infrastructure like OpenStack. These organizational scenarios are "generalized organizational scenarios" because the unified scheme does not deal with administrator-defined pairwise VM-to-VM affinity or anti-affinity rules/groups/filters. Instead, the unified scheme searches for an optimal solution which can satisfy the generalized organizational scenario. In essence, the generalized organizational scenario specifies, e.g., a constraint to keep all VMs together on one host server, but does not require which host server it is. The unified scheme not only finds a solution where all VMs are together on one host server to satisfy the generalized organizational scenario, the unified scheme also solves for an optimal host server for hosting all the VMs.

In contrast to this existing feature in OpenStack Nova Filter Scheduler, the unified scheme assists in enforcing the generalized organizational scenarios without the need to create the concept of server groups. Furthermore, the unified scheme can also allocate or place an entire group of VMs all at once or "simultaneously". So in the case of strict affinity, the unified scheme can guarantee a host is picked (if one exists with enough capacity) which in fact can accommodate all the VMs requiring affinity as part of a single request. And for anti-affinity, all VMs can be placed as part of a single VM placement request to be placed on different host servers. The unified scheme also differs from OpenStack Nova Filter Scheduler and VMware in that those solutions do not provide any support for generalized VM distribution constraints such as host count limits.

The systems and methods described here provide the specifications of describing the VM placement problem as a constraint optimization problem that solves the above mentioned scenarios, giving us the flexibility of ensuring these requirements along with any of the other compute requirements for the VMs, without any need for additional support for maintaining specialized affinity or anti-affinity groups as seen in other primitive solutions.

Exemplary VM Placement Optimization System which Augments VM Schedulers

Figure 1:
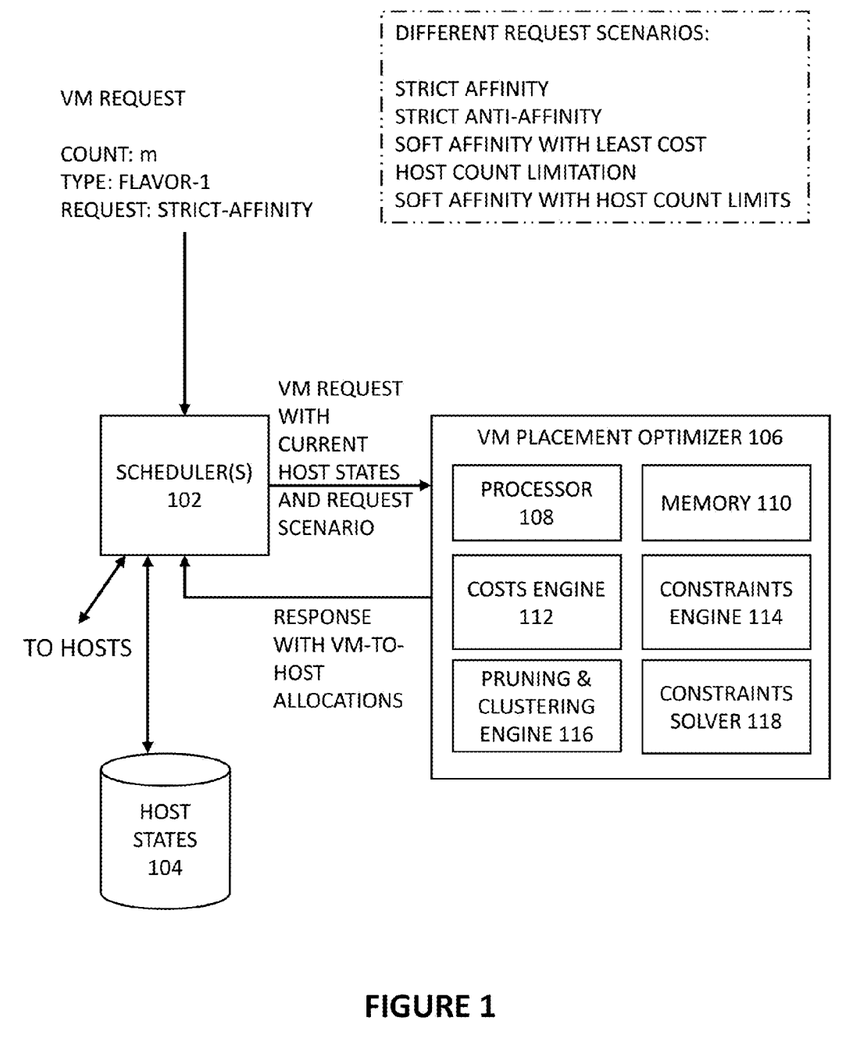
FIG. 1 shows an exemplary system for virtual machine scheduling and placement optimization, according to some embodiments of the disclosure.

FIG. 1 shows an exemplary system for virtual machine scheduling and placement optimization, according to some embodiments of the disclosure. The system includes scheduler 102, host states 104 (database), and VM placement optimizer 106. The scheduler 102 can receive a VM creation/placement request. The request can specify a number of VMs requested, e.g., requesting m VMs to be created. The request can specify a flavor or type of VM to be created. The request can specify one of many supported generalized organizational scenarios, e.g., strict affinity, strict anti-affinity, soft affinity with least cost, host count limitation, soft affinity with host count limitation, etc. In response to receiving the request, the scheduler 102 can retrieve host states information from host states 104 (e.g., a database, a repository, etc.). The host states information can include one or more of, e.g., identities of available host servers, capacity of available host servers, costs of using a particular host, etc. The scheduler 102 can then transmit a VM creation/placement request with host server states information and the requested generalized organizational scenario to VM placement optimizer 106 to determine an optimal set of VM-to-host allocations. For instance, the VM creation/placement request can request allocations of m VMs on n possible host servers. Upon determining the optimal set of VM-to-host allocations, VM placement optimizer 106 can transmit a response with the optimal set of VM-to-host allocations to scheduler 102 so that the scheduler 102 can schedule the VM creation specified by the optimal set (e.g., create VMs as needed, assign VMs to start processing one or more tasks, etc.).

VM placement optimizer 106 can include processor 108 and memory 110 (e.g., non-transitory computer readable storage medium) instructions stored on memory 110 can be executed by processor 108 to carry out or provide functionalities associated with parts including one or more of: the costs engine 112, constraints engine 114, pruning and clustering engine 116, and constraints solver 118. Costs engine 112 can compute various costs of allocating a particular VM to a particular host, and pairwise affinity-related costs between two host servers. Constraints engine 114 can manage and store different mathematical constraints to be used for different generalized organizational scenarios. For instance, the constraints engine 114 can receive the requested generalized organizational scenario and determine one or more constraints to be applied. Pruning and clustering engine 116 can reduce of the size of the constraints optimization problem. In some cases, constraints solver 118 can define/determine variable matrices, sets of variables, costs, and generally provide functions for setting up the constraints optimization problem. Moreover, constraints solver 118 can solve the constraints optimization problem by finding an optimal solution based on costs over the variables subject to one or more specified constraints associated with the generalized organizational scenarios.

Methodology and Setup of the Constraints Optimization Problem

As mentioned above, the unified scheme involves solving a constraints optimization problem with unique cost functions to be minimized and specially defined constraints. Advantageously, the setup of the constraints optimization problem provides the framework for determining one or more optimal solutions (with least cost) which satisfies a specified generalized organizational scenarios, including generalized affinity, anti-affinity, and generic VM distribution requirements, in terms of host count limits while performing the initial placement decisions for a set of VMs, e.g., in an OpenStack cloud infrastructure.

Instead of using rules, filters, pairwise specifications, groups, etc., a constraints optimization problem can specify generalized organization scenarios mathematically through innovative use of variables, constraints, and costs functions. The constraints optimization problem can be solved to ensure a perfect placement or selection of one or more host servers such that all the specified constraints are satisfied, and the total cost based on the specified cost functions is minimized. Specifically, the present disclosure provides the workflow, the required constraint optimization problem models with the definition of the required variables, constraint equations and the cost objective functions, which are unique for every single constraint optimization problem.

Figure 2:
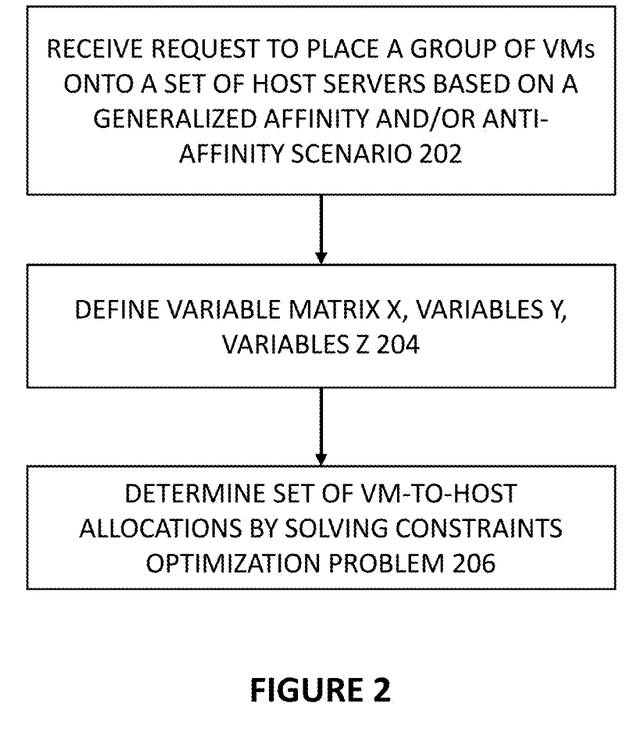
FIG. 2 shows a flow diagram illustrating a method for virtual machine placement optimization based on generalized organizational scenarios, according to some embodiments of the disclosure.

FIG. 2 shows a flow diagram illustrating a method for virtual machine placement optimization based on generalized organizational scenarios, according to some embodiments of the disclosure. A VM placement optimizer (e.g., VM placement optimizer 106 of FIG. 1) can receive a request to place a group of virtual machines onto a set of host servers based on a generalized organizational scenario (task 202). The VM placement optimizer, having a constraints solver (e.g., constraints solver 118), can define a variable matrix X, wherein each entry of the variable matrix indicate whether a particular virtual machine is to be placed on a particular host server (task 204). The VM placement optimizer, having a constraints solver (e.g., constraints solver 118), can define defining a first set of variables Y, wherein each variable of the first set of variables indicate whether a particular host server has at least one virtual machine to be placed thereon (task 204). In some cases, if needed, the VM placement optimizer, having a constraints solver (e.g., constraints solver 118), can define a second set of variables Z, wherein the second set of variables indicates for all possible pairs of host servers whether two particular host servers both have at least one virtual machine to be placed thereon (task 204). Z is a unique set of variables (not seen in conventional systems) because it provides a mechanism for enforcing certain generalized organizational scenarios. The VM placement optimizer, having a constraints solver (e.g., constraints solver 118), can determine a set of virtual machine to host server allocations (e.g., an optimal set of VM-to-host allocations) by solving a constraints optimization problem over the first set of variables and the second set of variables based on the generalized organizational scenario (task 206).

Figure 3:
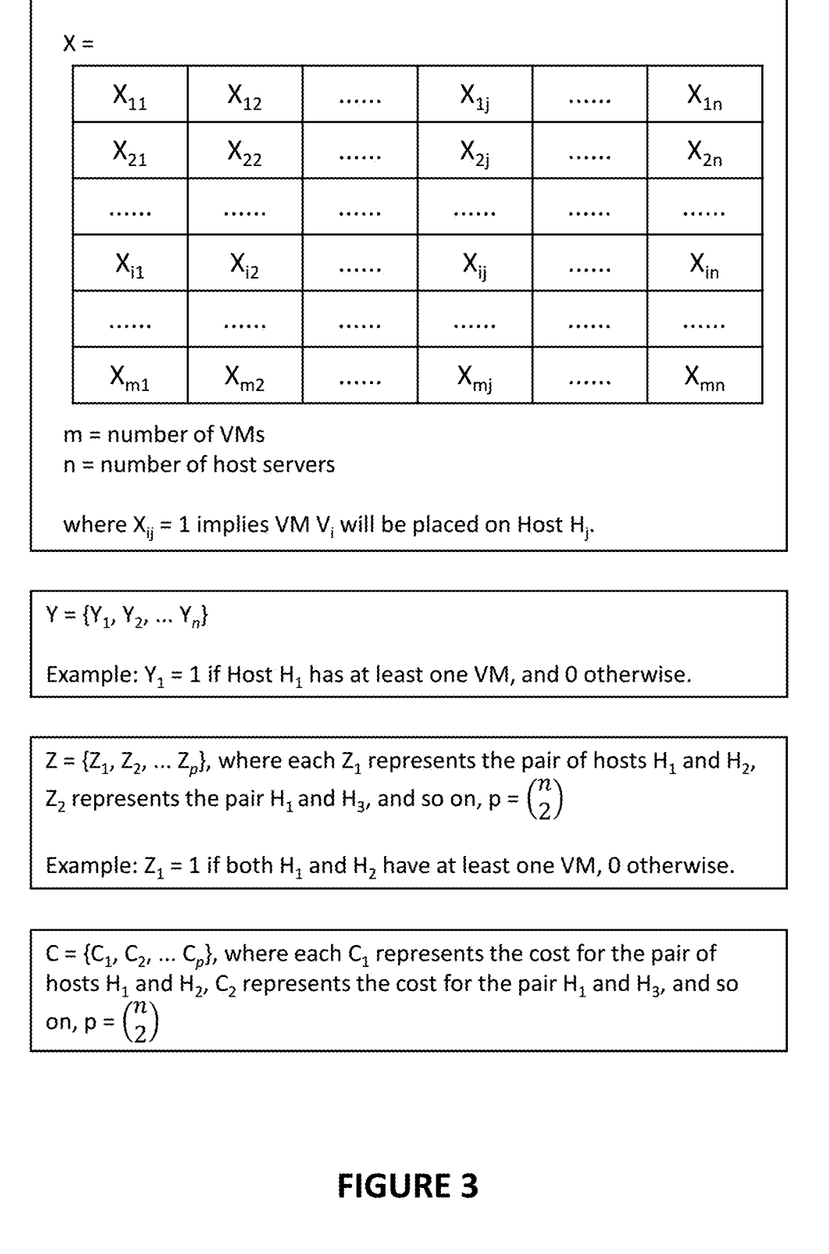
FIG. 3 shows a variable matrix, sets of variables, and affinity-related costs for a constraints optimization problem, according to some embodiments of the disclosure.

Consider a set of n host servers, $H=\{H_1, H_2, \ldots H_n\}$ and consider a request for creating or placing m VMs, $V=\{V_1, V_2, \ldots, V_m\}$. FIG. 3 shows a variable matrix X, sets of variables Y and Z, and affinity-related costs C for an exemplary constraints optimization problem, according to some embodiments of the disclosure. The variable matrix X is of size m by n, where m is the number of virtual machines and n is the number of host servers. The columns represent the (available) host servers, and the rows represent the VMs (though the orientation can be switched depending on the implementation). The entries or elements of the variable matrix, $X_{ij}$, can have a first value (e.g., 1) if VM $V_i$ is to be placed on host server $H_j$, and otherwise has a second value (e.g., 0). Thus, each entry of the variable matrix X indicate whether a particular virtual machine is to be placed on a particular host server. Further to the variable matrix X is a first set of variables Y. The first set of variables Y={$Y_1$, $Y_2$, . . . $Y_n$}, has n number of variables, where n is the number of host servers. For example, $Y_1$=1 if host server $H_1$ has at least one VM, and 0 otherwise. Thus, each variable of the first set of variables indicate whether a particular host server has at least one virtual machine to be placed thereon. Further to X and Y, a second set of variables Z={$Z_1$, $Z_2$, . . . $Z_p$} compare a pair-wise selection of host servers from the set of n host servers. The second set of variables indicates for all possible pairs of host servers whether two particular host servers both have at least one virtual machine to be placed thereon. The second set of variables has $$\binom{n}{2}$$

number of variables (n choose 2, $^nC_2$ or $$\frac{n!}{2!*(n-2)!}),$$

where n is the number of host servers. For instance, $Z_1$ represents the pair $H_1$ and $H_2$, $Z_2$ represents the pair $H_1$ and $H_3$, and so on. $Z_1$=1 if both $H_1$ and $H_2$ have at least one VM, 0 otherwise.

In addition to these problem parameters, the constraints optimization problem can take into account a set of affinity-related costs for each pair of host servers (e.g., when "soft" affinity is allowed), which each cost indicates the affinity-related cost of choosing a pair of host servers for the VMs. i.e., corresponding to each Z variable there is a known cost based on the pair of corresponding host servers. The VM placement optimizer (e.g., VM placement optimizer 106 having costs engine 112 of FIG. 1) can determine a set of affinity-related costs C={$C_1$, $C_2$, . . . $C_p$} associated with all possible pairs of host servers. This cost be an indicator of network cost or any suitable meaning of cost as set by the cloud administrator. The set of affinity-related costs has $$\binom{n}{2}$$

number of costs, where n is the number of host servers. For instance, $C_1$ represents the cost for the pair $H_1$ and $H_2$, $C_2$ represents the cost for the pair $H_1$ and $H_3$, and so on.

With the above problem parameters and specifications, different cost/objective functions and different sets of mathematical constraints can be applied depending on the requested generalized organizational scenarios. By properly describing the mathematical constraint optimization problem, which can be solved by a solver system, and the solutions can provide optimal VM placements for different generalized organizational scenarios.

Exemplary Organizational Scenario: Generalized Strict Affinity

Figure 4:
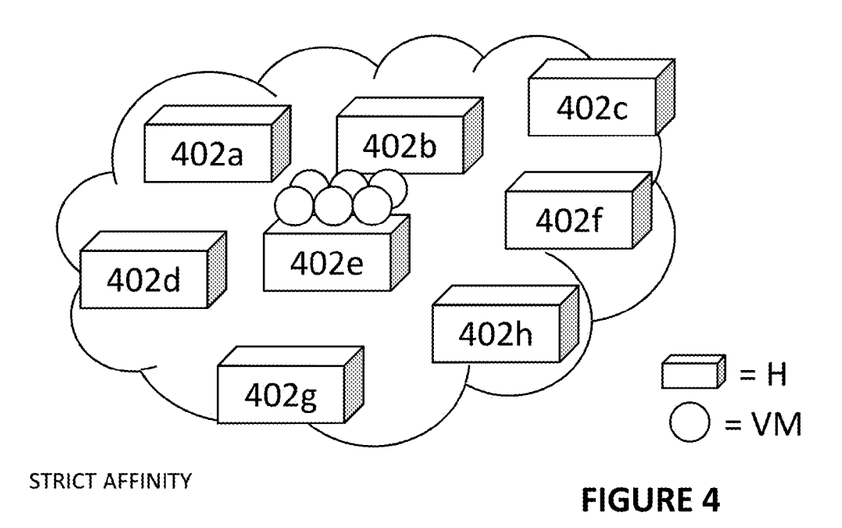
FIG. 4 illustrates a strict affinity scenario, according to some embodiments of the disclosure.

Generalized strict affinity, as used herein, defines the following task: solve the problem of placing a group of VMs in the given cloud infrastructure having a set of host servers, such that all the VMs will be instantiated on a single host server, that is the most optimal, and has sufficient capacity to accommodate all the VMs. FIG. 4 illustrates a strict affinity scenario, according to some embodiments of the disclosure. In the illustration, there are 10 host servers "H" 402*a-h*, and with a request to place 6 VMs. It can be seen from the illustration that, in a strict affinity scenario, all VMs are placed on one optimal host server, e.g., host server 402*e*.

When the generalized organizational scenario is a strict affinity scenario, solving the constraints optimization problem comprises minimizing cost of the virtual machine to host server allocation subject to the constraint that only one host server is selected in a solution of the constraints optimization problem. Phrased differently, the solution needs a single host server that can accommodate all the requested VMs. Suppose there is a cost for choosing each host server, represented by this function—host_cost($H_j$), the constraint optimization problem is represented as follows:

Minimize: Sum of [host_cost($H_j$) * $Y_j$] for every j in [1, n] host servers subject to the following constraints:
1. Row sum=1 for all rows in the matrix X. (A VM can be instantiated in only one host server)
   For every i in [1, m] (VMs) (i.e., for every row)
   Add the constraint: Sum of [$X_{ij}$]=1 for every j in [1,n] (host servers)
2. $Y_j$<=Column Sum<=m*$Y_j$ (To indicate whether a host server was selected)
   For every j in [1, n] (i.e., for every column)
   Add the constraint: $Y_j$ <=Sum of [$X_{ij}$] <=m*$Y_j$
3. Enforcing the strict affinity rule:
   Sum of [$Y_j$]=1 for j in [1, n].
   (i.e., only one of Y, can be 1, ensuring only one host server is picked.)
4. Constraint limiting the values of variables X and Y to be integers and either 0 or 1
   for all variables $X_{ij}$ and for all variables $Y_j$:
   0<=X, <=1
   0<=Y, <=1
   $X_{ij}$ and $Y_j$ are Integers.
5. In addition to the above constraints, other constraints can be added, e.g., to spe VM capacity requirements.

If the above problem is used using a linear programming LP-based constraint optimization solver and if a solution exists, the solution would provide a least costing optimal host server that can accommodate all the VMs.

Exemplary Organizational Scenario: Generalized Strict Anti-Affinity

Figure 5:
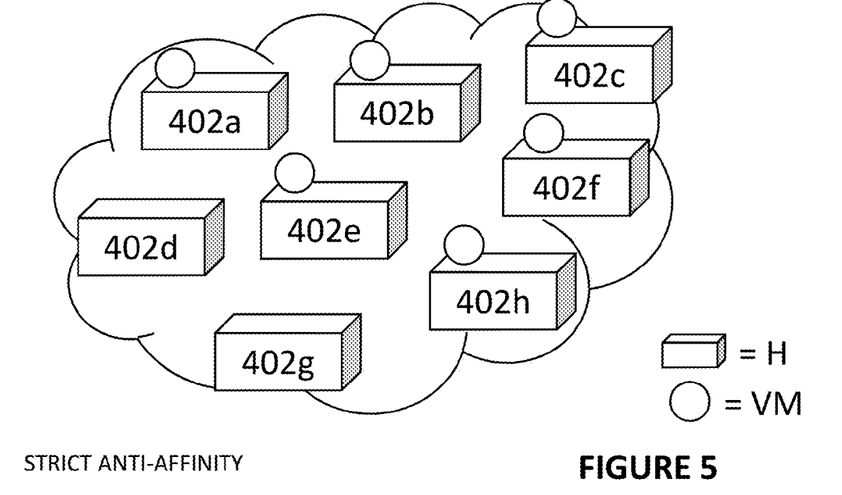
FIG. 5 illustrates a strict anti-affinity scenario, according to some embodiments of the disclosure.

Generalized strict anti-affinity, as used herein, defines the following task: solve the problem of placing a group of VMs, such that all VMs are placed in different host servers. FIG. 5 illustrates a strict anti-affinity scenario, according to some embodiments of the disclosure. In the illustration, there are 10 host servers "H" 402*a-h*, and with a request to place 6 VMs. It can be seen from the illustration that, in a strict anti-affinity scenario, VMs are placed on optimal and distinct host servers, e.g., one VM on host server 402*a*, one VM on host server 402*b*, one VM on host server 402*c*, one VM on host server 402*e*, one VM on host server 402*f*, and one VM on host server 402*h*.

When the generalized organizational scenario is a strict anti-affinity scenario, solving the constraints optimization problem comprises minimizing cost of the virtual machine to host server allocation subject to the constraint that m different host servers are selected in a solution of the constraints optimization problem, where m is a number of virtual machines requested to be placed. Phrased differently, the solution needs different/distinct host servers to accommodate all the requested VMs. Suppose there is a cost for choosing each host server, represented by this function—host_cost($H_j$), the constraint optimization problem is represented as follows:

Minimize: Sum of [host_cost($H_j$) * $Y_j$] for every j in [1, n] host servers subject to the following constraints:
1. Row sum=1 for all rows in the matrix X. (A VM can be instantiated in only one host server)
   For every i in [1, m] (VMs) (i.e., for every row) Add the constraint: Sum of [$X_{ij}$]=1 for every j in [1,n] (host servers)
2. Column Sum=$Y_j$ (To indicate whether a host server was selected, and to indicate each host server can at most have one VM, as $Y_j$ is either 0 or 1)
   For every j in [1, n] (i.e., for every column) Add the constraint: Sum of [$X_{ij}$]=$Y_j$
3. Enforcing the strict anti-affinity rule:
   Sum of [$Y_j$]=m for j in [1, n],
   (i.e., m different host servers will be chosen, with only m values of $Y_j$ being 1)
4. Constraint limiting the values of variables X and Y to be integers and either 0 or 1
   For all variables $X_{ij}$ and for all variables $Y_j$:
   $0<=X_{ij}<=1$
   $0<=Y_j<=1$
   $X_{ij}$ and $Y_j$ are Integers.
5. In addition to the above constraints, other constraints can be added to specify the VM capacity requirements.

If the above problem is solved using a linear programming LP-based constraint optimization solver and if a solution exists, the solution would provide a least costing optimal set of unique/distinct host servers that each accommodate one of the requested group of VMs.

Exemplary Scenario: Soft Affinity with Least Cost

Figure 6:
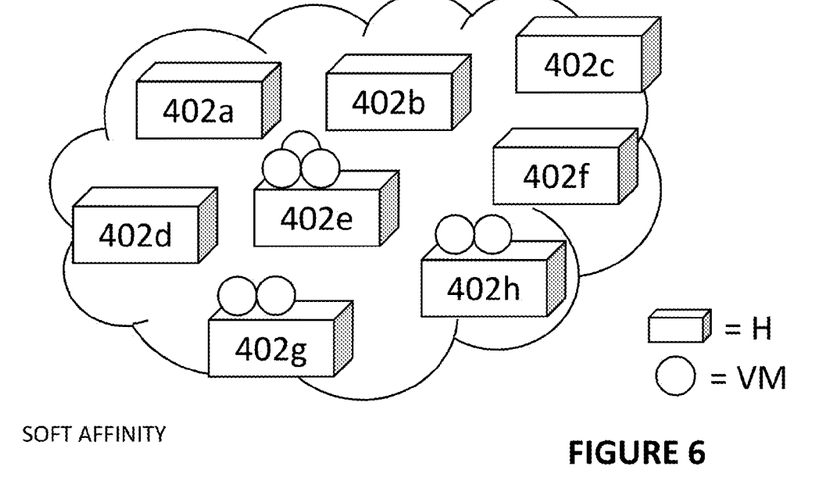
FIG. 6 illustrates a soft affinity (with least cost) scenario, according to some embodiments of the disclosure.

Soft affinity with least cost, as used herein, defines the following task: if it is not possible to place all VMs in a single host server, allow VM placement to more than one host servers, but such that the final selected set of host servers have the highest affinity (closest to each other) and/or the least cost (network cost). FIG. 6 illustrates a soft affinity (with least cost) scenario, according to some embodiments of the disclosure. In the illustration, there are 10 host servers "H" 402a-h, and with a request to place 6 VMs. It can be seen from the illustration that, in a soft affinity with least cost scenario, the VMs are placed on multiple optimal host servers, e.g., three VMs on host server 402e, two VMs on host server 02h, and two VMs on host server 402g.

When the generalized organizational scenario is a soft affinity scenario and solving the constraints optimization problem comprises (1) determining, by a costs engine, a set of affinity-related costs C associated with all possible pairs of host servers, and (2) minimizing cost of the virtual machine to host server allocation subject to the constraint that one or more different host servers are selected in a solution of the constraints optimization problem, wherein the cost to be minimized is computed based on the set of affinity-related costs associated with all possible pairs of host servers. Soft affinity also means that the second set of variables Z is used by the constraints optimization problem (the second set of variables Z indicates for all possible pairs of host servers whether two particular host servers both have at least one virtual machine to be placed thereon). Phrased differently, the solution allows for a set of host servers with highest affinity (closest to each other) to accommodate all the requested VMs. The best case is when a single host can actually accommodate all the requested VMs. Suppose there is a cost for choosing each host server, represented by this function—host_cost($H_j$), and also using our cost values C as described earlier, the constraint optimization problem is represented as follows:

Minimize: Sum of [$C_k$*(host_cost($H_x$)+host_cost($H_y$)) *$Z_k$] for every k in [1, p], with $$p = \binom{n}{2}$$

and variable $Z_k$ representing the pair of host servers $H_x$ and $H_y$, or variables $Y_x$ and $Y_y$, subject to the following constraints:
1. Row sum=1 for all rows in the matrix X. (A VM can be instantiated in only one host server)
   For every i in [1, m] (VMs) (i.e., for every row)
   Add the constraint: Sum of [$X_{ij}$]=1 for every j in [1,n] (host servers)
2. $Y_j$<=Column Sum <=m*$Y_j$(To indicate whether a host server was selected)
   For every j in [1, n] (i.e., for every column)
   Add the constraint: $Y_j$<=Sum of [$X_{ij}$]==m*$Y_j$
3. Addressing the pair-wise host server selection variables Z
   For every variable $Z_k$ where k in [1, p], with $$p = \binom{n}{2},$$

and representing the pair of host servers $H_x$ and $H_y$, or variables $Y_x$ and $Y_y$,
   Add the constraint: 2 * $Z_k$<=$Y_x$+$Y_y$<=1+$Z_k$
   So when Zk is 1 you are forcing $Y_x$+$Y_y$=2 and thereby selecting both host servers, i.e $Y_x$=1 and $Y_y$=1
   When $Z_k$ is 0 then 0<=$Y_x$+$Y_y$<=1, thereby allowing at most one of the host servers to be selected and potentially be paired with a different host.
4. Constraint limiting the values of variables X, Y, and Z to be integers and either 0 or 1
   For all variables $X_{ij}$ and for all variables $Y_j$:
   $0<=X_{ij}<=1$
   $0<=Y_j<=1$
   $0<=Z_k<=1$
   $X_{ij}$, $Y_j$ and $Z_k$ are Integers.
5. In addition to the above constraints, other constraints can be added to specify the VM capacity requirements.

If the above problem using a linear programming LP-based constraint optimization solver and if a solution exists, the solution would provide a least costing optimal set of one or more host servers that can accommodate all the VMs.

Exemplary Scenario: Host Count Limitation

Figure 7:
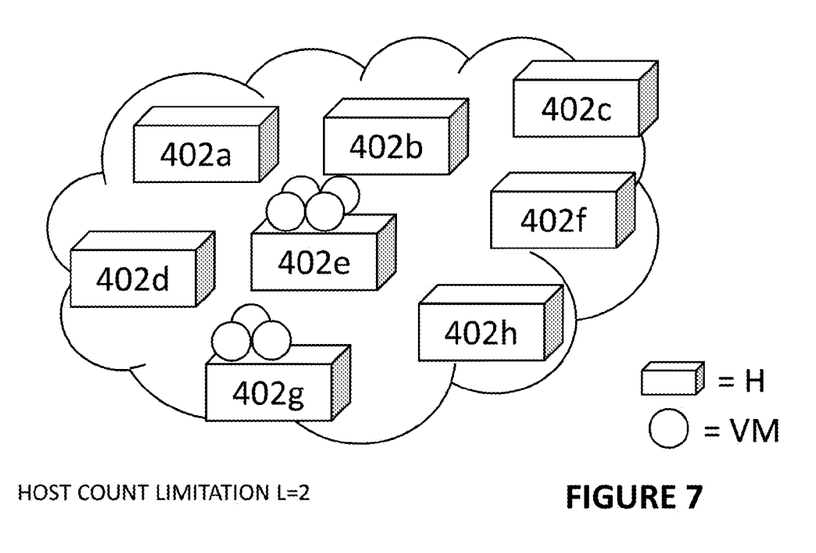
FIG. 7 illustrates a host count limitation scenario, according to some embodiments of the disclosure.

Host server count limitation or host count limitation, as used herein, defines the following task: related to the soft affinity scenario, solve the problem having a limit L on the maximum number of host servers chosen for placing a group of VMs. For example, a request can request 10 VMs to be placed (m=10), using at most 3 host servers (L=2). L is usually more than two (L=1 would revert back to a strict affinity scenario). FIG. 7 illustrates a host count limitation scenario, according to some embodiments of the disclosure. In this example, a request requests 7 VMS to be placed, using at most two servers. It can be seen from the illustration that, in a host count limitation scenario, VMs are placed on optimal and at most L host servers, e.g., four VMs on host server 402*e* and four VMs on host server 402*g*.

When the generalized organizational scenario specifies a host count limit of L number of host servers to be selected, solving the constraints optimization problem comprises minimizing cost of the virtual machine to host server allocation subject to the constraint that at most L number of servers are selected in a solution of the constraints optimization problem. Phrased differently, without worrying about affinity constraints, the optimization problem aims to enforce a requirement of limiting the number of host servers that can be used to create the requested set of VMs. Suppose there is a cost for choosing each host server, represented by this function—host_cost($H_j$), and if the specified host server count limit is represented by a constant L, the constraint optimization problem is represented as follows:

Minimize: Sum of [host_cost($H_j$)*$Y_j$]for every j in [1, n] host servers subject to the following constraints:
1. Row sum=1 for all rows in the matrix X. (A VM can be instantiated in only one host server)
   For every i in [1, m] (VMs) (i.e., for every row)
   Add the constraint; Sum of [$X_{ij}$]=1 for every j in [1,n] (host servers)
2. $Y_j$<=Column Sum<=m*$Y_j$(To indicate whether a host server was selected)
   For every j in [1, n] (i.e., for every column)
   Add the constraint: $Y_j$<=Sum of [$X_{ij}$]<=m*$Y_j$
3. Enforcing the host server count limitation rule:
   Sum of [$Y_j$]<=Lfor j in [1, n],
   (i.e., a maximum of L host servers will be chosen), where L is the specified limit of maximum number of host servers that can be used.
4. Constraint limiting the values of variables X and Y to be integers and either 0 or 1
   For all variables $X_{ij}$ and for all variables $Y_j$:
   0<=$X_{ij}$<=1
   0<=$Y_j$<=1
   $X_{ij}$ and $Y_j$ are Integers.
5. In addition to the above constraints, other constraints can be added to specify The VM capacity requirements.

If the above problem is solved using a linear programming LP-based constraint optimization solver and if a solution exists, the solution would provide a least costing optimal set of one or more host servers, with a maximum of a specified number of host server count, to accommodate all the requested VMs. In some cases, the constraint #3 in the above definition can be modified to allow a constraint that requires a fixed number of host servers to be used (e.g., replacing constraint #3 with Sum of [$Y_j$]=L for j in [1, n], i.e., an exact number of L host servers will be chosen), where L is the specified number of host servers that must be used.)

Exemplary Scenario: Soft Affinity with Host Count Limitation

Figure 8:
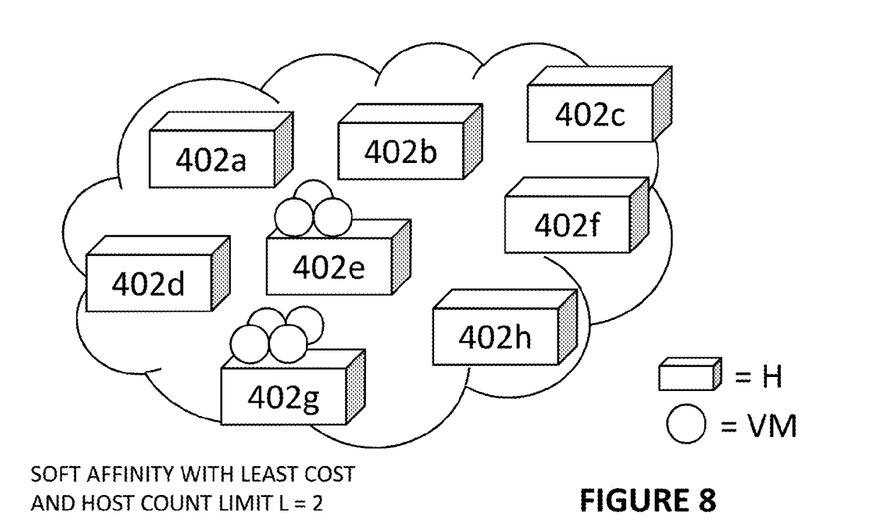
FIG. 8 illustrates a soft affinity scenario with host count limitation, according to some embodiments of the disclosure.

Soft affinity with host count limitation (combines soft affinity with least cost and host count limitation), as used herein, defines the following task: solve an optimization problem to cater to soft affinity scenarios with least cost, but with an additional requirement on the maximum number of host servers that can be used. FIG. 8 illustrates a soft affinity scenario with host count limitation, according to some embodiments of the disclosure. In the illustration, there are 10 host servers "H" 402*a-h*, and with a request to place 8 VMs on at most L=2 number of host servers. It can be seen from the illustration that, in a soft affinity with least cost scenario and host count limitation, the VMs are placed on at most L number of optimal hosts, e.g., three VMs on host server 402*e*, and four VMs on host server 402*g*.

When generalized organizational scenario specifies a soft affinity scenario with a host count limit of L number of host servers to be selected, solving the constraints optimization problem comprises: (1) determining a set of affinity-related costs C associated with all possible pairs of host servers; and (2) minimizing cost of the virtual machine to host server allocation subject to the constraint that at most L different host servers are selected in a solution of the constraints optimization problem, wherein the cost to be minimized is computed based on the set of affinity-related costs associated with all possible pairs of host servers. Soft affinity also means that the second set of variables Z is used by the constraints optimization problem (the second set of variables Z indicates for all possible pairs of host servers whether two particular host servers both have at least one virtual machine to be placed thereon). Phrased differently, the solution would allow for soft affinity with least cost with the constraint on the maximum number L of allowed host servers. In addition to the problem specification as provided for the soft affinity with least cost scenario (described in a previous section), one additional constraint is added:

Include the problem definition for "soft affinity with least cost", and add this additional constraint
6. Enforcing the host server count limitation rule:
   Sum of [$Y_j$]<=Lfor j in [1, n],
   (i.e., a maximum of L host servers will be chosen), where L is the specified limit of maximum number of host servers thai can be used.

Pruning and Clustering to Reduce Problem Size

Figure 9:
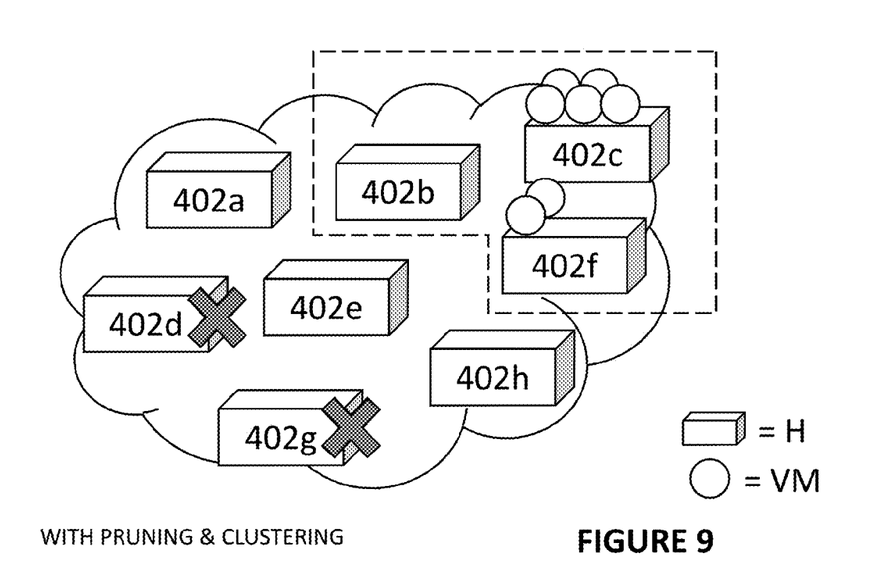
FIG. 9 illustrates pruning and clustering before optimizing based a generalized organizational scenario, according to some embodiments of the disclosure.

In some cases, the number of host servers is quite large, and running the optimization solver (even when the problem is of a linear order), can be quite computationally intensive. Instead of running the VM placement optimization problem on the large set of host servers, it is possible to provide an additional step to prune the problem space based on the physical servers capabilities for the current VM request, and/or perform a nearest neighbor clustering to come up a set of physical servers that are closest to each other. This step can be performed, for example, by pruning and clustering engine 116 of FIG. 1. FIG. 9 illustrates pruning and clustering before optimizing based a generalized organizational scenario, according to some embodiments of the disclosure. In this example, the pruning can remove, e.g., host server 402*d* and host server 402*g*. The clustering step can generate a cluster of host servers, e.g., based on the remaining host servers. A clustering engine can apply a clustering algorithm to reduce the set of host servers to a subset of host servers on which the virtual machines are to be placed prior to solving the constraints optimization problem based on the subset of host servers. For instance, the reduced cluster can include host server 402*b*, host server 402*c*, and host server 402*f*. It can be seen from the illustration that, when applying a soft affinity with least cost scenario on the reduced cluster, the VMs can placed on optimal hosts, e.g., five VMs on host server 402*e*, and two VMs on host server 402*f*.

For nearest neighbor clustering, clustering algorithms such as Locality sensitive Hashing (LSH) based on the definition of distance for the affinity scenario can be applied. After selecting a reduced cluster of nearest host servers, any one of the generalized operational scenario (e.g., strict affinity, soft affinity with least cost, soft affinity with least cost and host count limitation, host count limitation, etc.) can be applied on the reduced cluster to determine the optimal VM placements. If the clustering algorithm results in multiple possible clusters, the cluster to use can be selected based on the cluster's net affinity score. The net affinity score for a cluster can be calculated as the normalized net sum of all distances between all the members of a cluster (in other words, it is the average distance between members of the cluster).

The work flow can be modified as follows:

Task 1: VM placement request is received for "m" VMs based on a soft affinity scenario from a set of "n" physical host servers.

Task 2: Prune the "n" physical servers to filter out all those host servers that do not satisfy the resource capacity requirements of the VM.

Task 3: Run the clustering algorithm using LSH on the remaining physical servers and then rank based on the net affinity scores of each cluster, to select on cluster of at least size "m" if possible, if not select the cluster with the highest possible nodes.

Task 4: Run the soft affinity LP optimization to figure out the optimal VM placements.

Task 5: If result found in Step 4, exit, if not repeat Step 4 for the next cluster.

Task 6: If all clusters are tried, and no solution found, exit with no possible solution.

In some embodiments, the cluster with the least affinity score can be selected for the soft affinity scenario, before proceeding with the soft affinity LP optimization problem. When solving the soft affinity LP optimization problem, in addition to the affinity objective function, additional objective functions that arise based on the VM placement request can be included. In addition to the additional objective functions, it is also possible to include additional constraints in terms of, e.g., the maximum number of host servers that can be used, additional capacity constraints, etc.

The following outlines some examples of additional objective functions:

1. Maximize proximity of requested group of VM to a Cinder Volume while minimizing distance between them;
2. Maximize RAM/CPU Utilization while ensuring affinity;
3. Maximize proximity to group to a specified network that a tenant already holds in the cluster, while minimizing the distance between requested VMs; and
4. Maximize proximity to tenant's location of activity.

Providing pruning, clustering, and constraints optimization, the solution can meet various constraints while ensure that the VM-to-host server is optimal. The combination of all these features can provide a solution which a single feature (by itself) cannot enable.

Advantages

Typically problems such as these affinity related scenarios, there could be several solutions that can exist to figure out the optimal placements, but because of the nature of problem involving pair-wise comparison, they tend to be complex and usually non-linear. In contrast this solution provides a set of linear order solution for all the presented scenarios, and is capable of being solved using linear programming LP-based constraint optimization solvers.

In comparison to the Nova Filter scheduler features of ServerGroupAffinity and ServerGroupAntiAffinity filters, the unified scheme described herein proposes a generalized mechanism, where there is no necessity to create the concept of server groups, and the scheme can decide the placement of a group of more than one VMs all at once. So in the case of affinity, it is guaranteed to ensure a host is picked (if one exists with enough capacity) which in fact can accommodate all the VMs requiring affinity as part of a single request. And for anti-affinity, all VMs can be placed as part of a single VM placement request to be placed on different host servers. OpenStack Nova Filter Scheduler does not provide any support for generalized VM distribution constraints such as host count limits.

In general, the unified scheme offers more flexibility to include any generic constraints while addressing affinity, anti-affinity, and other VM distribution constraint scenarios, and also enables solving for the full request of multiple VMs all at once.

There is a clear advantage of solving for all VMs at once, because, if the VM placement request is fulfilled one by one, specifying the requested server group (like in the Openstack Nova server group functionality), it is likely to run into a situation of choosing a wrong host server in the beginning which may not have enough capacity to create a subsequent VM in the future, which was supposed to be part of that affinity group.

In comparison to VMware DRS (Dynamic resource scheduler) functionality with affinity and anti-affinity rules, the unified scheme described herein provides a unified constraints driven and cost driven approach to ensure the affinity and anti-affinity rules are met while performing an initial placement of VMs, and also ensuring the optimal set of host servers are chosen based on other requirements too. Even VMware Vsphere does not provide any support for generalized VM distribution constraints such as host count limits.

Variations and Implementations

Considering the nature of the problem, there could be several ways of solving the requirements, and typically problems involving affinity scenarios tend to be complex and a typical solution would require non-linear solvers. In contrast, the constraint optimization solving based solutions presented herein can be solved using Linear Programming LP-based constraint optimization solvers in a linear order of execution (to ensure efficient and fast execution) solvable using Linear Programming (LP)-based optimization solvers. In some cases, a python-based PULP modeling language or some other suitable language can be used to define the constraints and constraints optimization problem, which is based on solving Linear Programming (LP) type problems. And use from a combination of open-source linear constraint solvers such as CBC, GLPK, CPLEX, Gurobi, etc.

Within the context of the disclosure, a cloud of host servers generally includes host servers communicably connected over a network. A network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

As used herein in this Specification, the term 'network element' or parts shown in FIGS. 1 and 4-9, is meant to encompass suitable elements such as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements or parts shown in FIGS. 1 and 4-9 may include any suitable hardware, software, components, modules, interfaces, or objects that facilitate the virtual machine placement operations thereof. This may be inclusive of appropriate algorithms and communication protocols (which can be carried out by one or more processors) that allow for the effective exchange of data or information.

In one implementation, the VM placement optimizer described herein may include software to achieve (or to foster) the functions discussed herein for carrying out virtual machine placement optimization where the software is executed on one or more processors to carry out the functions. This could include the implementation of instances of costs engines, constraints engines, pruning & clustering engines, constraints solvers, and/or any other suitable element that would foster the activities discussed herein. Additionally, each of these elements can have an internal structure (e.g., one or more suitable processors, one or more memory elements, processor 108 of FIG. 1, memory 110 of FIG. 1, etc.) to facilitate some of the operations described herein. In other embodiments, these functions for VM placement optimization may be executed externally to these elements, or included in some other network element to achieve the intended functionality. Alternatively, the VM placement optimizer may include software (or reciprocating software) that can coordinate with other network elements in order to achieve the functions described herein. In still other embodiments, one or several devices may include any suitable algorithms, hardware, software, components, modules, interfaces, or objects that facilitate the operations thereof.

In certain example implementations, the VM placement optimization functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases/data structures related to costs, constraints, rules, host states, etc. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving VM placement optimization, as outlined herein. Additionally, each of these devices may include a processor that can execute software or an algorithm to perform the VM placement optimization activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements or parts shown in FIGS. 1, and 4-9. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of VM placement optimization, as potentially applied to a myriad of other architectures.

It is also important to note that the steps in the FIG. 2 (or steps/tasks described herein) illustrate only some of the possible scenarios that may be executed by, or within, the VM placement optimizer described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by VM placement optimizer in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for virtual machine placement optimization based on generalized organizational scenarios, the method comprising:
receiving a request to place a group of virtual machines onto a set of host servers based on a generalized organizational scenario;
defining a variable matrix, wherein each entry of the variable matrix indicate whether a particular virtual machine is to be placed on a particular host server;
defining a first set of variables, wherein each variable of the first set of variables indicate whether a particular host server has at least one virtual machine to be placed thereon;
defining a second set of variables, wherein the second set of variables indicates for all possible pairs of host servers whether two particular host servers both have at least one virtual machine to be placed thereon; and
determining a set of virtual machine to host server allocations by determining an optimal solution allocating a set of virtual machines to one or more host servers based on costs of virtual machine to host server allocation subject to one or more constraints limiting values of the first set of variables and values the second set of variables, wherein the one or more constraints implement the generalized organizational scenario.

2. The method of claim 1, wherein the variable matrix is of size m by n, where m is a number of virtual machines and n is a number of host servers.

3. The method of claim 1, wherein the first set of variables has n number of variables, where n is a number of host servers.

4. The method of claim 1, wherein the second set of variables has $$\binom{n}{2}$$

number of variables, where n is a number of host servers.

5. The method of claim 1, wherein the generalized organizational scenario is a strict affinity scenario and determining the optimal solution comprises minimizing cost of the virtual machine to host server allocation subject to a constraint that only one of the values of the first set of variables equals to one such that only one host server is selected in the optimal solution.

6. The method of claim 1, wherein the generalized organizational scenario is a strict anti-affinity scenario and determining the optimal solution comprises minimizing cost of the virtual machine to host server allocation subject to a constraint that a sum of the values of the first set of variables equals to m such that m different host servers are selected in the optimal solution, where m is a number of virtual machines requested to be placed.

7. The method of claim 1, wherein the generalized organizational scenario is a soft affinity scenario and determining the optimal solution comprises:
determining, by a costs engine, a set of affinity-related costs associated with all possible pairs of host servers; and
minimizing cost of the virtual machine to host server allocation subject to constraints limiting the values of the first set of variables and the values of the second set of variables such that one or more different host servers are selected in the optimal solution, wherein the cost to be minimized is computed based on the set of affinity-related costs associated with all possible pairs of host servers.

8. The method of claim 7, wherein the set of affinity-related costs has $$\binom{n}{2}$$

number of costs, where n is a number of host servers.

9. The method of claim 1, wherein the generalized organizational scenario specifies a host count limit of L number of host servers to be selected and determining the optimal solution comprises minimizing cost of the virtual machine to host server allocation subject to a constraint that a sum of the values of the first set of variables is less than or equal to L such that at most L number of servers are selected in the optimal solution.

10. The method of claim 1, wherein the generalized organizational scenario specifies a soft affinity scenario with a host count limit of L number of host servers to be selected and determining the optimal solution comprises:
determining a set of affinity-related costs associated with all possible pairs of host servers; and
minimizing cost of the virtual machine to host server allocation subject to a constraint that a sum of the values of the first set of variables is less than or equal to L such that at most L different host servers are selected in the optimal solution, wherein the cost to be minimized is computed based on the set of affinity-related costs associated with all possible pairs of host servers.

11. The method of claim 1, further comprising:
applying, by a clustering engine, a clustering algorithm to reduce the set of host servers to a subset of host servers on which the group of virtual machines are to be placed prior to determining the optimal solution based on the subset of host servers.

12. A virtual machine placement optimizer for optimizing virtual machine placement based on generalized organizational scenarios, the virtual machine placement optimizer comprising:
at least one memory element;
at least one processor coupled to the at least one memory element; and
a costs engine that when executed by the at least one processor is configured to:
receive a request to place a group of virtual machines onto a set of host servers based on a generalized organizational scenario;
define a variable matrix, wherein each entry of the variable matrix indicate whether a particular virtual machine is to be placed on a particular host server;
define a first set of variables, wherein each variable of the first set of variables indicate whether a particular host server has at least one virtual machine to be placed thereon; and
define a second set of variables, wherein the second set of variables indicates for all possible pairs of host servers whether two particular host servers both have at least one virtual machine to be placed thereon; and a constraints solver that when executed by the at least one processor is configured to:

determining an optimal solution allocating a set of virtual machines to one or more host servers based on costs of virtual machine to host server allocation subject to one or more constraints limiting values of the first set of variables and values the second set of variables, wherein the one or more constraints implement the generalized organizational scenario.

13. The virtual machine placement optimizer of claim 12, wherein:

the variable matrix is of size m by n, where m is a number of virtual machines and n is a number of host servers;

the first set of variables has n number of variables, where n is a number of host servers; and the second set of variables has $$\binom{n}{2}$$

number of variables, where n is a number of host servers.

14. The virtual machine placement optimizer of claim 12, further comprising:

a clustering engine that when executed by the at least one processor is configured to applying a clustering algorithm to reduce the set of host servers to a subset of host servers on which the group of virtual machines are to be placed prior to determining the optimal solution based on the subset of host servers.

15. A computer-readable non-transitory medium comprising one or more instructions, for virtual machine placement optimization based on generalized organizational scenarios, that when executed on at least one processor configure the at least one processor to perform one or more operations comprising:

receiving a request to place a group of virtual machines onto a set of host servers based on a generalized organizational scenario;

defining a variable matrix, wherein each entry of the variable matrix indicate whether a particular virtual machine is to be placed on a particular host server;

defining a first set of variables, wherein each variable of the first set of variables indicate whether a particular host server has at least one virtual machine to be placed thereon;

defining a second set of variables, wherein the second set of variables indicates for all possible pairs of host servers whether two particular host servers both have at least one virtual machine to be placed thereon; and determining an optimal solution allocating a set of virtual machines to one or more host servers based on costs of virtual machine to host server allocation subject to one or more constraints limiting values of the first set of variables and values the second set of variables, wherein the one or more constraints implement the generalized organizational scenario.

16. The computer-readable non-transitory medium of claim 15, wherein the generalized organizational scenario is a strict affinity scenario and determining the optimal solution comprises minimizing cost of the virtual machine to host server allocation subject to a constraint that only one host server is selected the optimal solution.

17. The computer-readable non-transitory medium of claim 15, wherein the generalized organizational scenario is a strict anti-affinity scenario and determining the optimal solution comprises minimizing cost of the virtual machine to host server allocation subject to a constraint that a sum of the values of the first set of variables equals to m such that m different host servers are selected in the optimal solution, where m is a number of virtual machines requested to be placed.

18. The computer-readable non-transitory medium of claim 15, wherein the generalized organizational scenario is a soft affinity scenario and determining the optimal solution comprises:

determining, by a costs engine, a set of affinity-related costs associated with all possible pairs of host servers; and minimizing cost of the virtual machine to host server allocation subject to the constraints limiting the values of the first set of variables and the values of the second set of variables such that one or more different host servers are selected in the optimal solution, wherein the cost to be minimized is computed based on the set of affinity-related costs associated with all possible pairs of host servers.

19. The computer-readable non-transitory medium of claim 15, wherein the generalized organizational scenario specifies a host count limit of L number of host servers to be selected and determining the optimal solution comprises minimizing cost of the virtual machine to host server allocation subject to a constraint that a sum of the values of the first set of variables is less than or equal to L such that at most L number of servers are selected in the optimal solution.

20. The computer-readable non-transitory medium of claim 15, wherein the generalized organizational scenario specifies a soft affinity scenario with a host count limit of L number of host servers to be selected and determining the optimal solution comprises:

determining a set of affinity-related costs associated with all possible pairs of host servers; and minimizing cost of the virtual machine to host server allocation subject to a constraint that a sum of the values of the first set of variables is less than or equal to L such that at most L different host servers are selected in the optimal solution, wherein the cost to be minimized is computed based on the set of affinity-related costs associated with all possible pairs of host servers.

* * * * *